United States Patent Office.

ORRIN F. HARRIS, OF NORWICH, CONNECTICUT.

Letters Patent No. 109,895, dated December 6, 1870.

IMPROVEMENT IN MEDICAL COMPOUNDS.

The Schedule referred to in these Letters Patent and making part of the same.

*To all whom it may concern:*

Be it known that I, ORRIN F. HARRIS, M.D., of Norwich, in the county of New London and State of Connecticut, have discovered a new and useful Composition of Matter, which is a specific remedy for the disease called the piles.

The nature of my discovery consists in combining podophyllin, nux vomica, (alcoholic extract,) and conium, (alcoholic extract,) in certain proportions.

To enable others skilled in the art to make and use my invention, I will describe the parts or proportions of each ingredient employed in forming each pill.

I take of podophyllin, one quarter of a grain; of nux vomica, alcoholic extract, two grains; and of conium, alcoholic extract, three grains, for one pill, which constitutes one dose.

What I claim as my invention, and desire to secure by Letters Patent, is—

The composition of matter composed of the ingredients aforesaid, in substantially the proportions aforesaid, to be used as a remedy for the disease called the piles.

ORRIN F. HARRIS, M. D.

Witnesses:
    J. HULSEY,
    GEO. A. HARRIS.